United States Patent [19]

Davenport et al.

[11] Patent Number: 5,283,951
[45] Date of Patent: Feb. 8, 1994

[54] METHOD OF PRODUCING A TUBING FOR USE AS A FLOW CONDUIT

[75] Inventors: Eugene F. Davenport, Union, Mich.; Curtis R. Heckaman, South Bend, Ind.; Benjamin R. Kessler, South Bend, Ind.; Jay A. Simpson, South Bend, Ind.

[73] Assignee: Curtis Products, Inc., South Bend, Ind.

[21] Appl. No.: 992,548

[22] Filed: Dec. 17, 1992

[51] Int. Cl.⁵ .............................................. B23P 19/04
[52] U.S. Cl. ................................ 29/890.144; 29/890.15; 285/334.5; 285/354
[58] Field of Search ............ 285/349, 334.5, 354, 285/382; 29/890.15, 890.144, 511, 512, 523, 465

[56] References Cited

U.S. PATENT DOCUMENTS

| | | | |
|---|---|---|---|
| 1,484,295 | 2/1924 | Bundy | 285/382 |
| 2,469,851 | 5/1949 | Stecher et al. | 285/104 |
| 2,522,194 | 9/1950 | Richardson | 285/382 |
| 2,545,168 | 3/1951 | Richardson | 285/334.5 |
| 3,092,404 | 6/1963 | MacWilliam | 285/354 |
| 3,393,930 | 7/1968 | Ziherl et al. | 285/354 |
| 3,576,335 | 4/1971 | Kowal | 285/354 |
| 3,833,984 | 9/1974 | Dietzel | 29/890.15 |
| 4,538,842 | 9/1985 | Kowal et al. | 285/354 |
| 4,598,937 | 7/1986 | Sugao | 285/334.5 |
| 5,131,145 | 7/1992 | Badoureaux | 29/512 |

FOREIGN PATENT DOCUMENTS

| | | | |
|---|---|---|---|
| 2817438 | 10/1979 | Fed. Rep. of Germany | 285/334.5 |
| 3-219192 | 9/1991 | Japan | 285/334.5 |

Primary Examiner—Eric K. Nicholson
Attorney, Agent, or Firm—R. Tracy Crump

[57] ABSTRACT

A hydraulic coupling and method for producing such having a tubing with an end portion of a tubing wall outwardly bent and return bent upon itself to form a flattened double flanged end. The method of production using three separate press hits to secure a sleeve to the tubing, to form an annular V-shaped flange in the tubing wall and to compact the V-shaped flange into a flattened double flanged end.

1 Claim, 3 Drawing Sheets

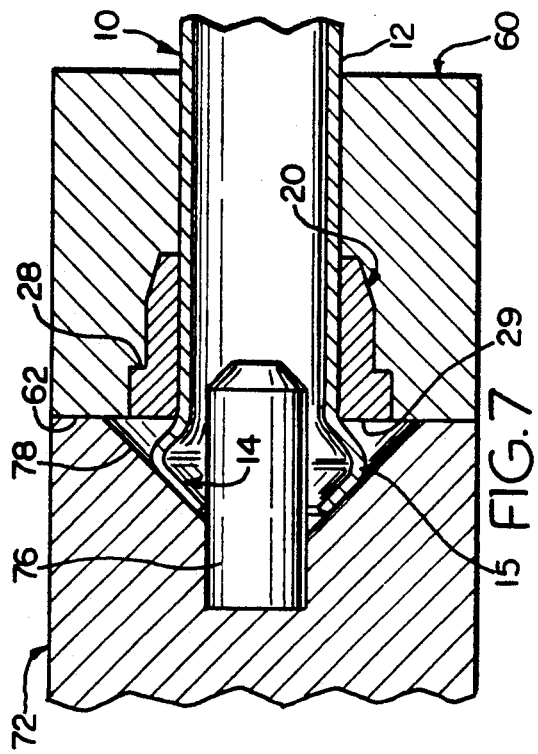
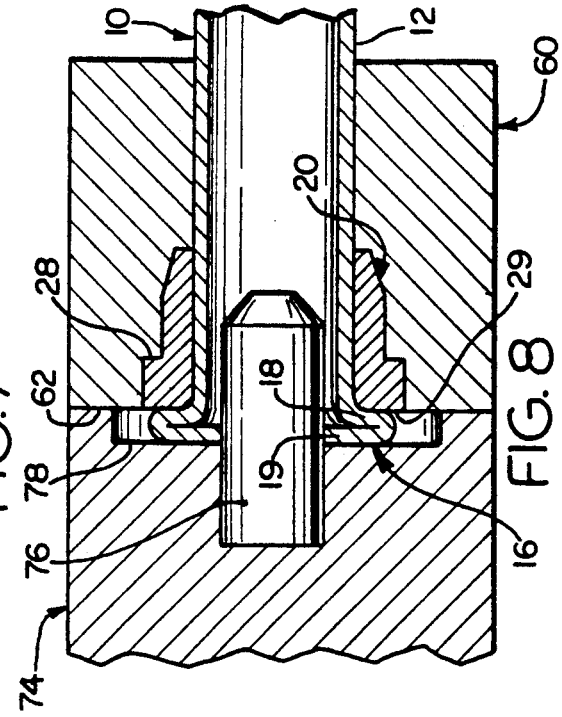
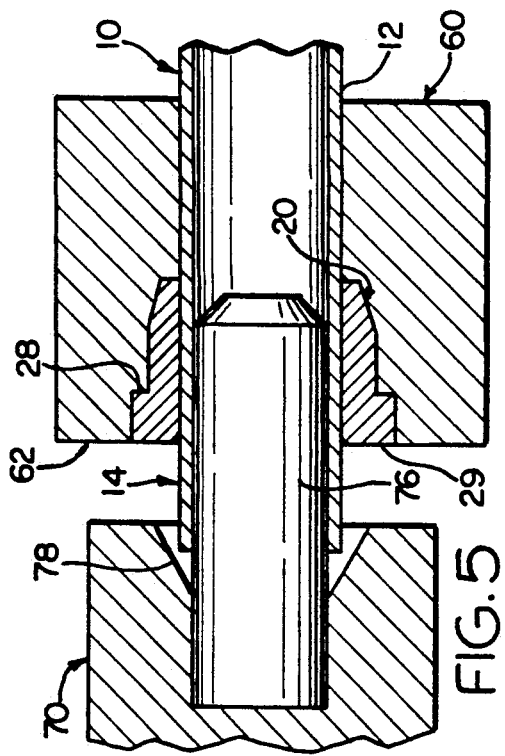
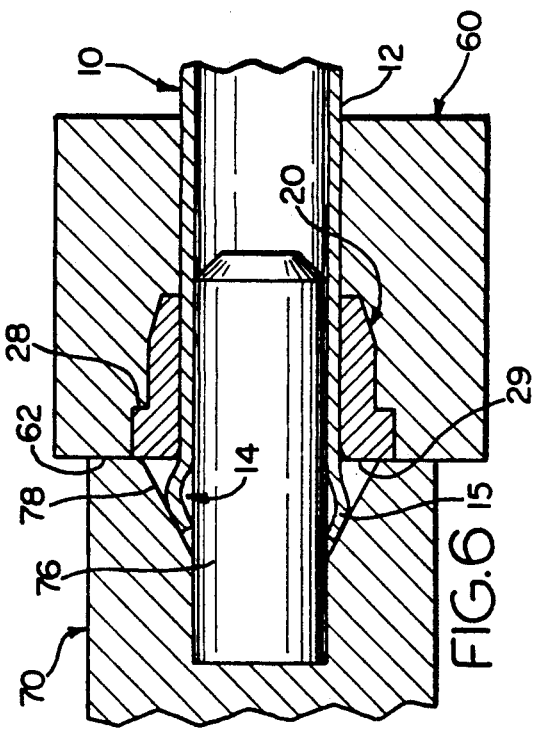

METHOD OF PRODUCING A TUBING FOR USE AS A FLOW CONDUIT

This invention relates to a flanged tubing end for use as a connection fitting and to the method for producing the same.

BACKGROUND AND SUMMARY OF INVENTION

The connection fitting of this invention creates an improved sealing action by using a tubing with a special flattened double flanged end. The flattened double flange end seals with a O-ring seal retained in an annular recess in the end face of a mating male connector. The flattened double flanged end is formed by doubling over and flattening a portion of the tubing wall against a collar fitting or sleeve. This flattened double walled flange design has several advantages over flat single flanged fittings. The flattened double walled flange guard against failure and provide increased strength over a single walled flange. The flattened double flanged end accommodates conventional fittings and does not require any special connectors, fittings or tooling for use in existing applications. Improvements in conventional fittings often require special fittings and tooling.

The improved flattened double flanged end is produced using a machine press with a unique three press hit method. A sleeve is loosely positioned on the end of the tubing with a portion of the tubing wall protruding beyond the sleeve. The length of the extending wall is approximately equal to twice the intended flange height. The tube and sleeve are firmly secured within the machine press by a set of specially designed clamp dies. The clamp dies hold the tubing and sleeve in the proper position.

Using three separate press hits with three separate contact dies, the machine press expands the tubing wall against the face of the sleeve, flares an end portion of the tubing wall and presses the flaring into a flattened end flange. Each contact die has a center pilot and a contact face. The first contact die has an inwardly inclined conical contact face. On the first press hit, the press drives the pilot of the first contact die into the end of the tubing. The slightly larger diameter of the center pilot expands tubing walls against the sleeve's inner bore to secure the sleeve to the tube. In the last distance of travel of the stroke in the first press hit, the exposed tubing end contacts the inclined contact face of the contact die crimping the tubing wall outward into a shallow U-shaped flange bubble.

The second press hit uses a second contact die. The second contact die is comprised of a conical contact face with a greater incline angle relative to the center pilot than the first contact die. The hit stroke further flares the U-shaped flange in the tubing walls. The final press hit uses a third contact die with a flat contact face. The third press hit compacts the flared U-shape flange bubble and drives the tubing wall into a recess in the contact face to form the flattened double flange. The pilot of the second and third contact dies simply prevent the tubing walls from intruding into the conduit opening.

The use of this method to produce the flattened double flanged end is well suited for production application because the entire tooling process can be performed within a very short period of time. The impact method also eliminates any complicated machining or forming. The simplicity of the impact press also decreases the failure rate, while allowing for mass quantity production.

Accordingly, an object of this invention is to provide a novel and unique flanged connection fitting.

Another object of this invention is to provide a tubing with a flattened double flanged end for use as a connection fitting.

Another object of this invention is to provide a method of efficiently producing a tubing with a flattened double flanged end for use as a connection fitting.

Other objects will become obvious upon a reading of the following specification taken along with the drawings.

BRIEF DESCRIPTION OF THE DRAWINGS

FIG. 5 is a side plan view of the tubing and sleeve clamped in the locked position by the clamp dies and showing the first contact die partially inserted into the tubing.

FIG. 6 is a side plan view of the tubing and sleeve clamped in the locked position by the clamp dies and showing the first contact die fully inserted into the tubing and the clamp dies.

FIG. 7 is a side plan view of the tubing and sleeve clamped in the locked position by the clamp dies with the second contact die fully inserted into the tubing and the clamp dies.

FIG. 8 is a side plan view of the tubing and sleeve clamped in the locked position by the clamp dies with the third contact die fully inserted into the tubing an.

DESCRIPTION OF THE PREFERRED EMBODIMENT

The preferred embodiment herein described is not intended to be exhaustive or to limit the invention to the precise form disclosed. It is chosen and described to illustrate the principles of the invention and its application and practical use to allow others skilled in the art to follow its teachings.

Figure 2:
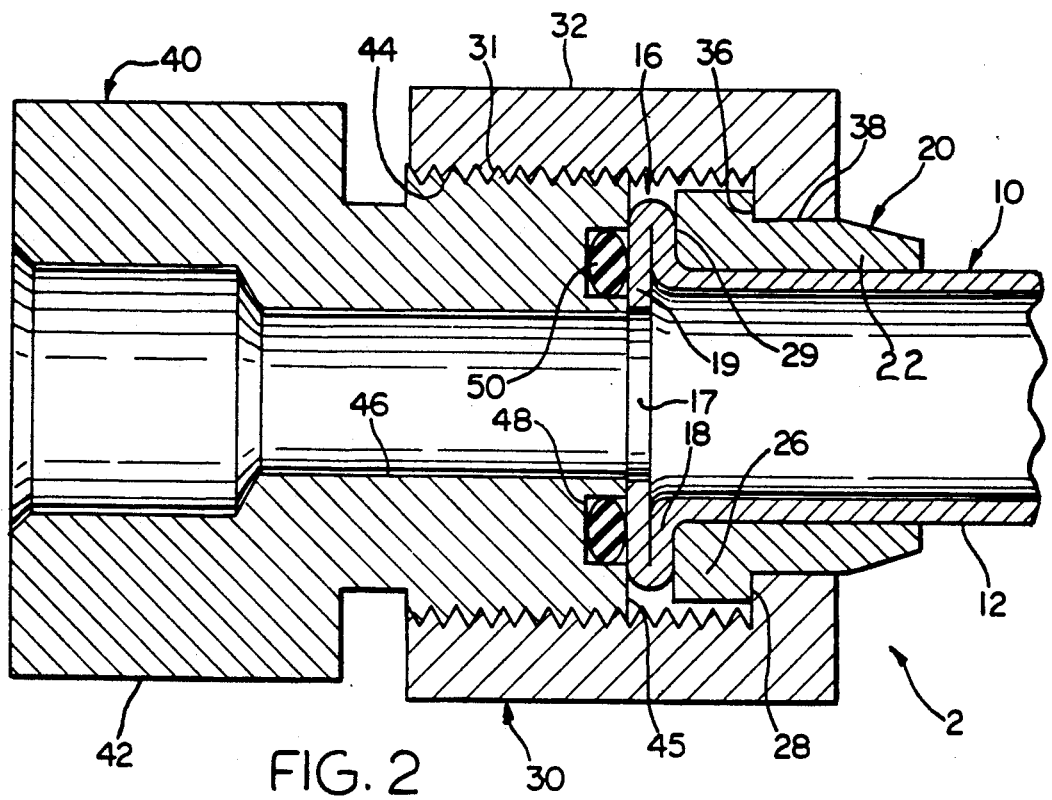
FIG. 2 is a side plan view of the tubing and connection coupling.
Figure 1:
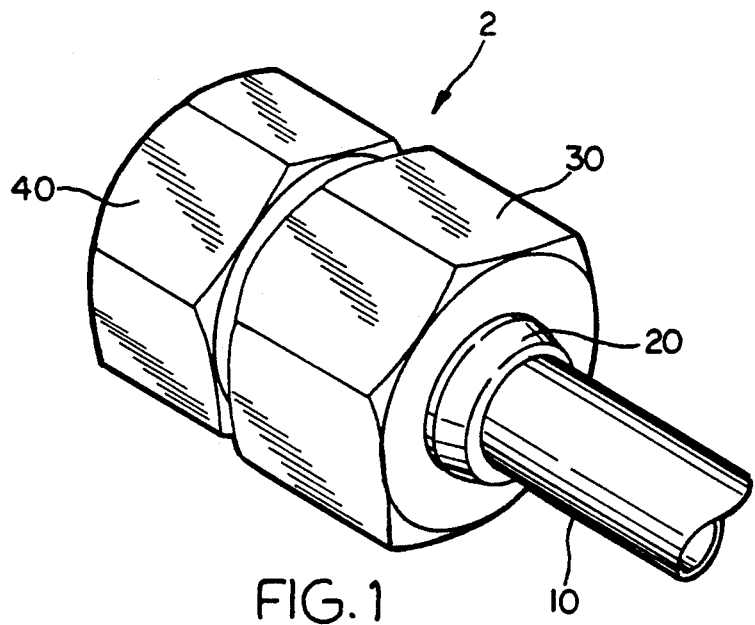
FIG. 1 is a perspective view of the tubing and connection coupling.

FIGS. 1 and 2 show connector coupling 2. Connector coupling 2 includes tubing 10, collar fitting or sleeve 20, female connector 30, male connector 40 and O-ring 50 Male connector 40 has a hexagonal circumference 42 and an externally threaded cylindrical end 44. Center bore 46 extends axially through male connector part 40 providing a conduit for passage of a medium flow therethrough. Cylindrical end 44 has a flat end face 45 with an annular recess 48 about bore 46. Recess 48 accepts O-ring 50 with O-ring 50 outwardly protruding partially from recess 48.

As shown in the figures, walls 12 of pipe or tubing 10 form a flow conduit. Tubing 10 has a flat end flange 16 with an end opening 17. End portion 14 of the tubing wall 12 has inner fold 18 outwardly bent and an outer fold 19 return bent upon inner fold 18. Folds 18 and 19 form flat end flange 16. Inner fold 18 abuts against face 29 of sleeve 20. Outer fold 19 abuts against flat face 45 of male connector 40 engaging O-ring 48. The compressed engagement of end flange 16, O-ring 50 and flat face 45 of male connector 40 provides a strong leak proof seal.

Sleeve 20 has a hollow cylindrical body 22 and an out-turned annular end flange 26. Flange 26 forms shoulder 28 with body 22 and has a flat end face 29. Hollow body 22 forms a longitudinal center bore 24. The inner diameter of bore 24 is slightly greater than the outer diameter of tubing 10. Tubing 10 is journalled through bore 24 of sleeve 20.

Female connector 30 has a hexagonal exterior body 32 with a threaded cylindrical interior cavity 31. Threaded cavity 31 connectively accepts threaded exterior end 44 of male connector 40. Female connector 30 has an in-turned end flange 86 with a central flange opening 38. Female connector 30 restrictively journals sleeve 20 and tubing 10 through opening 38. End flange 36 engages shoulder 26 of sleeve 20, such that association of the threaded portions 44 and 34 of male and female connectors 30 and 40 urges sleeve 20 and tubing end 16 against face 45 of male connector 40.

Figure 3:
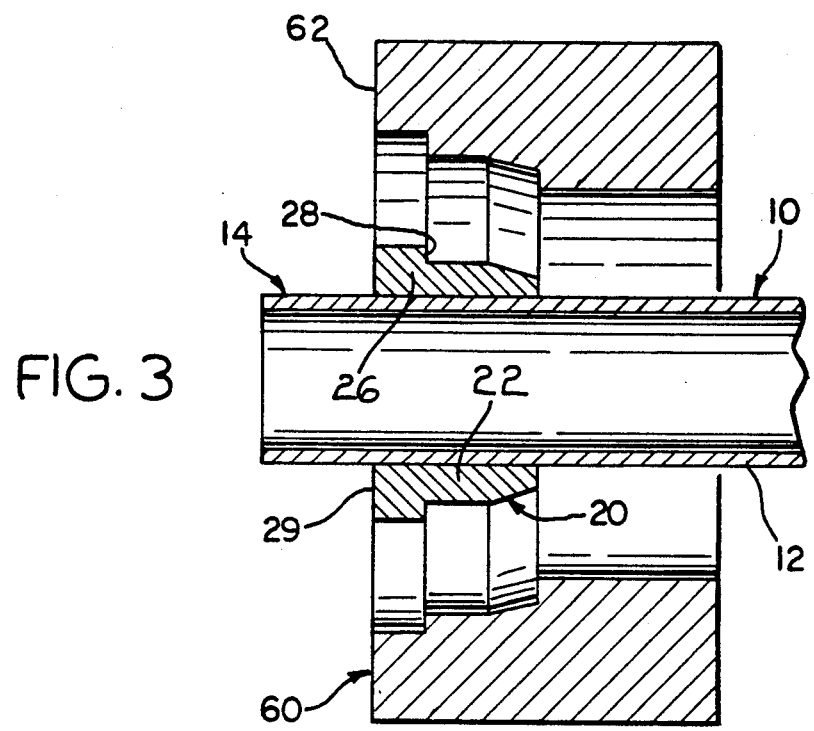
FIG. 3 is a side plan view of the tubing and sleeve between the clamp dies in the unlocked position.
Figure 4:
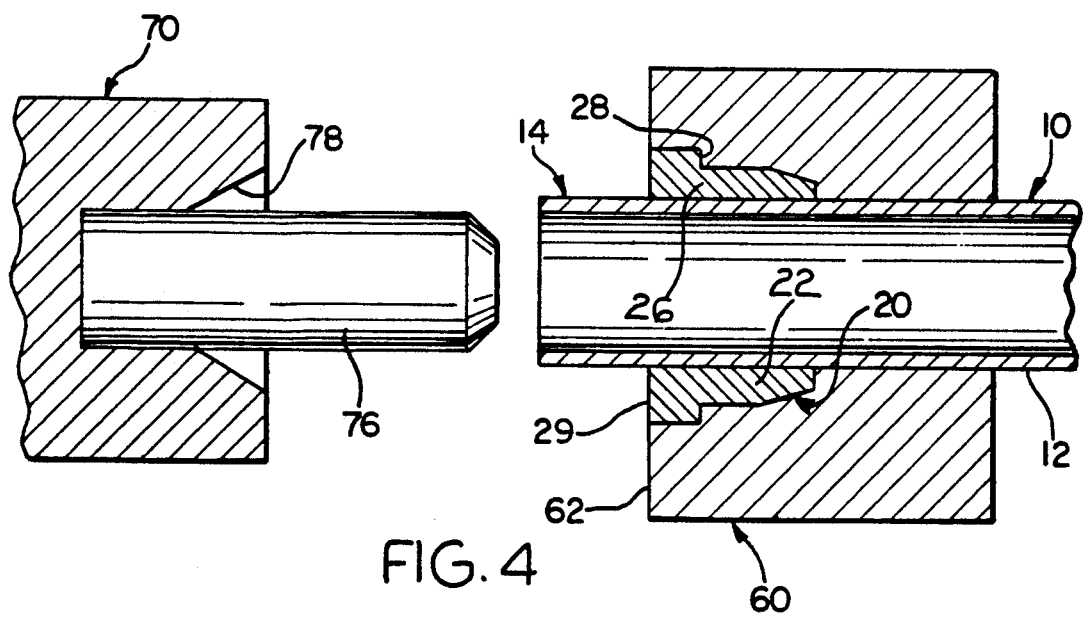
FIG. 4 is a side plan view of the tubing and sleeve clamped in the locked position by the clamp dies and further showing the first contact die in pre-striking position.

End flange 16 is produced using a machine press (not shown) having a standard pneumatic or hydraulic impact piston cylinder. The machine press uses an impact piston to impact end portion 14 of tubing 10 with three separate contact dies. The machine press has no patentable significance to this invention and only provides an apparatus for executing the production method of this invention. The double flanged end 16 of tubing 10 is produced in the following described method:

Sleeve 20 is placed on the end of tubing 10. Sleeve 20 can be manually or mechanically positioned on tubing 10, as shown in FIG. 3, with end portion 14 of tubing wall 12 protruding beyond face 29 of sleeve 20. The length of end portion 14 must be sufficient to form end flange 16, being approximately twice the height of flange 16.

Tubing 10 and sleeve 20 are restrictively positioned in machine press by a pair of clamp dies 60. Clamp dies 60 are especially tooled to accommodate the outer contours of tubing 10 and sleeve 20. Dies 60 maintain the position of sleeve 20 along tubing 10 with end portion 14 protruding past face 29. As seen in FIGS. 3-8, end faces 62 of dies 60 align with face 29 of sleeve 20 with only end portion 14 of tubing 10 extending outside face 62 of dies 60.

The machine press piston uses three alternating contact dies 70, 72 and 74. The machine press impacts end portion 14 with each contact die in a separate press hit. All three contact dies have pilot guides 76. Pilot 76 of contact die 70, shown only in FIGS. 5 and 6, has an outer diameter slightly greater than the inner diameter of tubing 10. The outer diameter of pilots 76 of dies 72 and 74 are approximately equal to or less than the inner diameter of tubing 10 and serve only to prevent tubing walls 12 from intruding into the flow conduit during impact. Contact die 70 is used for the first press hit. Contact die 70 has an inwardly conical contact face 78 inclined at approximately a 28° angle. As shown in FIG. 5, contact die 70 is driven into end portion 14 of tubing wall 12. Pilot 76 of die 70 with its greater outer diameter expands tubing walls 12 outward against sleeve 20. The expanded tubing walls 12 press against sleeve 20 to permanently secure sleeve 20 to tubing 10. Expanding tubing wall 12 to secure sleeve 20 eliminates the bonding or brazing conventionally required to mount sleeve 20. As shown in FIG. 6, the last segment of travel of the first hit drives contact face 78 against end portion 14 of tubing wall 12. The impact of the contact die 70 compacts end portion 14, flaring tubing walls 12 outwardly into a V-shaped bubble or flange 15. The forward stroke of the impact piston is limited by contact die 70 abutting end faces 62 of clamp dies 60. The rearward stroke of the impact piston withdraws the contact die 70 and pilot 76 from contact with V-shaped flange 15 of tubing 10.

In the second press hit, shown in FIG. 7, contact die 72 is attached to the machine press piston. Contact face 78 of contact head 72 engages end portion 14. The incline angle of the conical contact face 78 of contact die 72 is greater than that of contact die 70 inclined at approximately a 60° angle. Upon impact, the contact head 72 compacts tubing end portion 14, further pronouncing the flaring of V-shaped flange 15. The forward stroke of the piston is again limited by contact die 72 abutting end faces 62 of clamp dies 60. The second hit is used as an intermediate step to insure a properly aligned third hit. Pilot 76 of contact die 72 prevents tubing wall 12 of V-shaped flange 15 from protruding into the flow conduit during the impact.

In the third press hit, shown in FIG. 8, impact is made with contact die 74. Contact die 74 has a flat contact face 78 perpendicular to the longitudinal axis of tubing 10. On full extension, the contact face 78 compacts end portion 14 of tubing wall 12 against the outer face 29 of sleeve 20. V-shaped flange 15 in tubing wall 12 is completely compressed forming double folded flange 16. Again, pilot 76 of contact die 74 prevents tubing wall 12 from deforming into the flow conduit and provides a smooth uniform opening.

I claim:

1. A method of producing a tubing for use as a flow conduit including a tubular wall forming a part of said flow conduit, said wall terminating in a flat end flange, said end flange being formed at an end portion of said wall by the following steps:
    a) inserting a sleeve onto said tubing;
    b) positioning said sleeve along said wall end portion with a part of said wall end portion protruding from said sleeve;
    c) expanding said wall into compressing engagement with said sleeve to secure said sleeve to said wall;
    d) compacting said protruding wall end portion part a partial distance to flare said wall outward to form an annular radially extending V-shaped flange overlying said sleeve;
    e) compressing said V-shaped flange against said sleeve with a first component of the V-shaped flange extending radially outward and an integrally connected second component of the V-shaped flange being return bent upon said first component to form said flat end flange.

* * * * *